Jan. 22, 1924.
H. A. CUMFER
1,481,255
TRANSPORTING CONDUIT FOR VISCOUS SUBSTANCES AND PROCESS OF MAKING THE SAME
Filed July 15, 1920
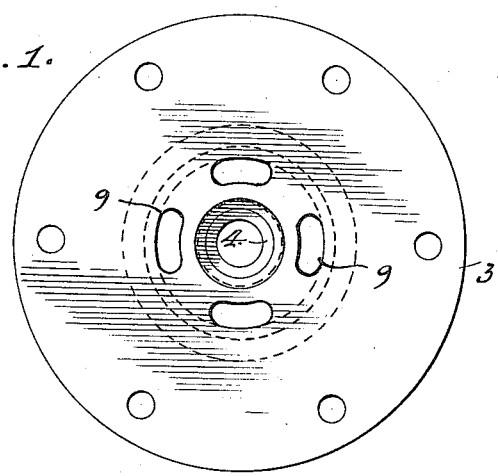
Fig. 1.
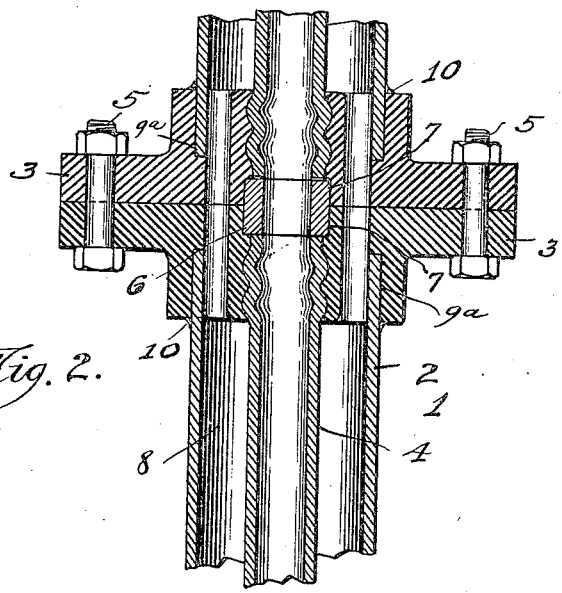
Fig. 2.
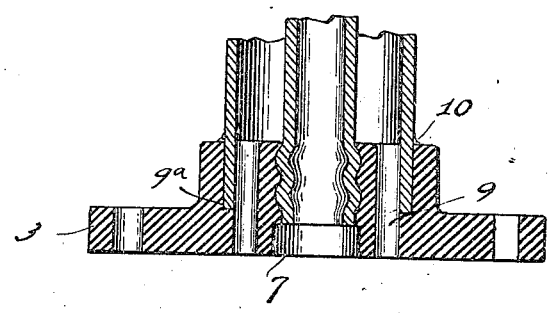
Witness,
J. B. Mann
Inventor,
Harry A. Cumfer.
By Frank L. Belknap, Atty.

Patented Jan. 22, 1924.

1,481,255

UNITED STATES PATENT OFFICE.

HARRY A. CUMFER, OF CHICAGO, ILLINOIS.

TRANSPORTING CONDUIT FOR VISCOUS SUBSTANCES AND PROCESS OF MAKING THE SAME.

Application filed July 15, 1920. Serial No. 396,492.

*To all whom it may concern:*

Be it known that I, HARRY A. CUMFER, a citizen of the United States, residing in the city of Chicago, county of Cook, and State of Illinois, have invented certain new and useful Improvements in Transporting Conduits for Viscous Substances and Processes of Making the Same, of which the following is a specification.

This invention relates to a method of making transporting conduits for viscous substances and refers to the forming of conduits for transporting asphalts, bitumens and other mastic materials and particularly those that become solid or semi-solid at normal temperatures. These substances necessitate jacketted transporting pipes which permit a liquid or vapor heating medium to be circulated through their jacketed portions, whereby the transported product may be kept in a freely flowing state by the high temperature.

Among the salient objects of the invention are to provide a simple and effective means for uniting the inner and outer pipes of the conduits to a connecting flange portion, a method which is cheap and at the same time, resists effectively the conditions of heat and pressure to which they are necessarily subjected; to provide a method for forming the inner and outer portions, which permits of the making up of conduits of standard pipe lengths and at the same time, obviating the use of threaded flanged connections screwed to the end of the jacketed conduits, and in general to provide a product of the character described.

In the drawings:

Fig. 1 is an end view of the conduit connecting flange.

Fig. 2 is a sectional view of two connecting conduits with parts broken away.

Referring to the drawings, the conduit designated as a whole at 1, comprises an outer jacketed portion 2, a connecting flange 3, and an inner product pipe 4. The flanges are abutted as shown in Fig. 2 and connected to form a pressure tight joint, by means of the bolts and nuts 5 and collar 6. This collar fits into recesses in either flange as shown at 7 and assures a tight connection between the adjoining product ducts of the connecting conduits. Between outer jacket 2 and the product pipe 4 is a circulating space 8, which communicates with the ducts 9 in the flanged portions, said ducts connecting the circulating spaces of the connecting conduits. Steam or any hot liquid medium is circulated through the jacket portion in order to keep the inner product pipe at a high tempearture so that the viscous substance transported therein shall be kept in the liquid state.

Dealing particularly with the construction of the respective conduits which may be made up in any desired lengths, the inner aperture of the flanges into which the product pipe is placed, has a curved construction to accommodate the grooves of the product pipe which is hydraulically pressed into the grooves of said aperture to make a liquid tight joint therewith. The outer jacketed portion 2 is fitted into the recesses 9ª of the flanged portion and electrically welded at 10, assuring thereby a tightness of this connection. By means of this construction is obviated the necessity of threading both the product pipe and the outer jacket and thereafter screwing the same into the flanged portion. Flanges screwed to pipes in this manner when used for purposes of this sort where great differences in temperature and pressure are involved, are objectionable due to the expansion and contraction of the metals, and particularly at the flanged connections.

By the construction shown, the flange is combined with the inner and outer shells of the conduit to form a unitary structure and thereby decrease, to a marked degree, the trouble experienced due to the expansion and contraction of the metal at these connections. Also, these jacket conduits can be made by any standard lengths and marketed as is any standard pipe. It will be understood that this construction may be used not only in the lengths of conduits but in any type of fittings which are necessary in connection with a system for the transporting of viscous material. Further, the item of cost in the manufacture of conduits of this type and the labor in connection therewith is a substantial item and is greatly decreased by this type of construction.

I claim as my invention:

1. Jacketed conduits comprising inner product transporting pipes, circulating shells surrounding the transporting pipes, and connecting flanges having said pipes and shell portions rigidly fitted thereto.

2. Jacketed conduits for transporting viscous substances comprising inner product pipes pressed into connection flanges and outer circulating shells surrounding the product pipes and pressed and welded in recesses in said connection flanges.

3. Jaketed fittings for transporting viscous substances comprising inner product pipes having circulating shells for coursing a fluid heating medium around the product pipes, connection flanges, said pipes and circulating shells combined by pressure with said flanges to form unitary structures.

4. A process of combining connecting flanges to the transporting and circulating portions of jacketed conduits and jacketed fittings consisting in pressing said product and circulating portions into the flanges.

5. A process of combining connecting flanges to the transporting and circulating portions of jacketed conduits and jacketed fittings consisting in hydraulically pressing the product and circulating portions into the flanges, subsequently expanding the product portion into the flange and welding the exterior joint of the flange and circulating portion.

HARRY A. CUMFER.